Oct. 28, 1941.  P. TRAPANI  2,260,352

COMBINATION SEAT AND BACK

Filed Jan. 29, 1938

INVENTOR
Paul Trapani
BY
ATTORNEY

Patented Oct. 28, 1941

2,260,352

UNITED STATES PATENT OFFICE 2,260,352

COMBINATION SEAT AND BACK

Paul Trapani, New York, N. Y.

Application January 29, 1938, Serial No. 187,628

3 Claims. (Cl. 155—182)

The present invention relates to a flexible seat construction and it particularly relates to a flexible seat and back combination which may be readily applied or attached to chair, automobile seats and so forth.

During the summer it is uncomfortable to sit upon the usual upholstered or hard seat and back chairs and couches, and it is particularly uncomfortable to sit upon the usual type of automobile seats.

It is among the objects of the present invention to provide a simple, inexpensive, lightweight seat attachment or seat and back construction which may be readily applied to the usual type of couch, chair or automobile seat without deforming or necessity of reconstructing such chair, couch or seat, and which at the same time will give perfect ventilation and assure greater comfort to the user.

Other objects will be obvious or will be apparent during the course of the following specification.

In accomplishing the above objects it has been found most satisfactory to form the seat of flexible members preferably of strip metal (for example aluminum), which may engage the seat or chair whether it be upholstered or of hard material at several places.

The back and seat elements may be pivotally connected together and both elements or preferably the back alone is provided with suitable attachment means for connection to an automobile seat or a chair or any other devices to which the seat construction is to be attached. The seat and back body contact portions are preferably formed of a network or woven material of metal wire or of textile yarns.

These body contact members are preferably resiliently supported by side brace members of greater resiliency than the supporting framework positioned substantially away from and above said supporting framework.

Preferably the supporting members may be attached to and extend along the side frame elements and they may conveniently consist of relatively small diameter rods or small strips, which are suitably bent to conform to the shape of the frame.

In the drawing is shown one of the preferred embodiments of the present invention, to which, however, the present invention is by no means restricted, since many modifications and changes might be made therein, all within the scope of the appended claims.

Fig. 1 is a top perspective view of the seat and back construction,

Fig. 2 is a transverse sectional view upon the line 2—2 of Fig. 1, illustrated in outline the attachment of the seat construction of the present application to an automobile seat by way of illustration and, Fig. 3 is a top view of the seat and back folded away from each other.

Referring to the seat construction as shown in Figs. 1 to 3, the back structure A and seat structure B are provided with the side frame elements 10 and 17 respectively.

The side frame elements 10 of the back member A are curved or convexed to conform to the back of an automobile seat illustratively indicated at C in Fig. 2 and they are curved over and backwardly at their upper ends, as indicated at 11 and terminate in the depending portions 12, which are designed to grip and clamp in back of the upper portion 13 of the automobile seat C. The side elements 10 are connected by the cross braces 14 and 15 and at their lower ends they are pivotally connected at 16 (see Fig. 2) to the side elements 17 of the seat frame B.

Preferably the frame elements 17 of the seat B are spaced inside of the frame elements 10 of the back A, since this forms a more substantial and more rigid structure. The seat side elements 17 are connected by the cross element 18. The frame elements 10, 14, 15, 17 and 18 may be made of strip aluminum or stainless steel or brass stock, preferably of such dimension as to be quite resilient and desirably not of greater thickness than $\frac{1}{16}$ or $\frac{1}{8}$ of an inch.

The hinge construction 16 is preferably formed by turning over or looping the inside ends of the frame elements 10 and 17 to form a recess through which a pivot pin may be fitted.

Attached to the side frame elements 10 of the back A are the side braces 19 which are curved backwardly and downwardly as indicated at 20 to be attached to the side members 10 at 21 below the curved portions 11. At their lower ends, the members or braces 19 are inclined downwardly and inwardly as indicated at 22 and they are connected at their lower ends 23 to the lower ends of the side frame members 10 where they may be spot welded or riveted in position.

If desired, the intermediate portions of the braces 19 may be connected by reinforcing legs 24 to the frame members 10, but in all cases the elements 19 should desirably have greater resiliency than the frame members 10. The upper net 25 of fabric or wire mesh is connected by the middle portions of the braces 19 to support the back and it is sufficiently taut to prevent contact by the back with the base frame of the seat A.

In respect to the seat element, the seat B is provided with the rectangular shaped brace member 26, which has the side portions 27 bowed above the side frame elements 17 and having downturned portions 28 at its forward side. At the front of the seat B the portions 28 integrally connect with inturned portions 29 connecting in turn with the transverse element 30. The element 30 is in turn fastened to the outer ends of the frame element 17. The rear ends 48 of the side elements 27 are also bent downwardly where they may contact with the portions 22 of the braces 19.

The lower ends of the elements 48 are connected by the cross member 49, which is connected to the rear ends of the side frame members 17. The intermediate portions of the bowed elements 27 may be connected by the legs 50 to the side frame elements 17, if desired, but as stated before the resiliency of the bowed elements 27 should be greater than that of the frame elements 17.

Suspended between the bowed elements 27 is the net 31 which may be of the same construction as the net 25 and should preferably be of the same tautness.

Ordinarily in utilization, the back and seat elements A and B will be in the position as indicated in Figs. 1 and 2 with the points 31 and 32 supporting the front of the seat B upon the automobile seat D and with the side elements 10 and 17 and the hooks 11 and 12, assuring a firm connection to the back of the main seat C.

It is thus apparent that the applicant has provided a simple, inexpensive, readily attachable construction for automobile seats and chairs which will assure maximum comfort for the user thereof, particularly in driving in summer.

It is obvious that many changes may be made in the sizes and shape of the stock and in the construction of the frame, since diagonal bracing is possible instead of the lateral bracing as shown and it is intended to include all such variations in the scope of the present application.

The body contacting materials 25 and 31 may be made of interwoven, or a mesh work of, wire, cloth, fiber, textiles, cane and so forth. The structural elements 10 and 17 may be made of one piece with the elements 10 extending into the elements 17. The bowed elements 19 and 27 also might be made of one piece with the lower ends of the elements 19 being integrally connected with the rear ends of the elements 27.

Although the elements 10, 14, 15, 17, 19 and 26 may be made of a light material, such as aluminum or brass, they also may be readily made of iron or of hollow tubing, if desired. Although the structure consisting of the members 27, 30 and 49 is of generally rectangular contour, it is to be understood it may also take other shapes, as may also the frameworks A, B and D.

Many other changes could be effected in the particular features of combination seat and back construction designed, and in methods of operation set forth, and in specific details thereof, without substantially departing from the invention intended to be defined in the claims, the specific description herein merely serving to illustrate certain elements by which, in one embodiment, the spirit of the invention may be effectuated.

What is claimed is:

1. A combination including detachable seat and back rests, each comprising an upper resilient metal frame of rod metal material and a lower resilient metal frame of strip metal stock having less resiliency than the upper frame, said frames being connected by hinge connection at the back of the seat rest and at the bottom of the back rest, and flexible body contact members carried by said upper frames, each of said lower frames consisting of parallel side strip elements with transverse connecting members and each of said upper frames consisting of parallel rod elements positioned above and connected at their ends and middle portions to said side strip elements, said upper resilient metal frame for the back rest and for the seat rest being substantially identical in width, and said upper resilient metal frame and said lower resilient metal frame for the back rest being substantially identical in width and said lower resilient metal frame for the seat rest being substantially narrower than the upper resilient frame of the seat rest, said rod elements being turned inwardly and downwardly toward said strip elements at their ends.

2. A combination including detachable seat and back rests, each comprising an upper resilient metal frame of rod metal material and a lower resilient metal frame of strip metal stock having less resiliency than the upper frame, said frames being connected by hinge connection at the back of the seat rest and at the bottom of the back rest, and flexible body contact members carried by said upper frames, each of said lower frames consisting of parallel side strip elements with transverse connecting members and each of said upper frames consisting of parallel rod elements positioned above and connected at their ends and middle portions to said side strip elements, said upper resilient metal frame for the back rest and for the seat rest being substantially identical in width, and said upper resilient metal frame and said lower resilient metal frame for the back rest being substantially identical in width and said lower resilient metal frame for the seat rest being substantially narrower than the upper resilient frame of the seat rest, said strip elements being less resilient than said rod elements.

3. A combination including detachable seat and back rests, each comprising an upper resilient metal frame of rod metal material and a lower resilient metal frame of strip metal stock having less resiliency than the upper frame, said frames being connected by hinge connection at the back of the seat rest and at the bottom of the back rest, and flexible body contact members carried by said upper frames, each of said lower frames consisting of parallel side strip elements with transverse connecting members and each of said upper frames consisting of parallel rod elements positioned above and connected at their ends and middle portions to said side strip elements, said upper resilient metal frame for the back rest and for the seat rest being substantially identical in width, and said upper resilient metal frame and said lower resilient metal frame for the back rest being substantially identical in width and said lower resilient metal frame for the seat rest being substantially narrower than the upper resilient frame of the seat rest.

PAUL TRAPANI.